US008805165B2

(12) United States Patent
Luo et al.

(10) Patent No.: US 8,805,165 B2
(45) Date of Patent: Aug. 12, 2014

(54) ALIGNING AND SUMMARIZING DIFFERENT PHOTO STREAMS

(75) Inventors: Jiebo Luo, Pittsford, NY (US); Jianchao Yang, Champaign, NY (US)

(73) Assignee: Kodak Alaris Inc., Rochester, NY (US)

( * ) Notice: Subject to any disclaimer, the term of this patent is extended or adjusted under 35 U.S.C. 154(b) by 760 days.

(21) Appl. No.: 12/942,391

(22) Filed: Nov. 9, 2010

(65) Prior Publication Data

US 2012/0113121 A1    May 10, 2012

(51) Int. Cl.
*G06T 11/20* (2006.01)
*G06K 9/46* (2006.01)
*H04N 9/80* (2006.01)

(52) U.S. Cl.
USPC .......................... 386/278; 386/239; 386/248

(58) Field of Classification Search
None
See application file for complete search history.

(56) References Cited

U.S. PATENT DOCUMENTS

| | | | |
|---|---|---|---|
| 6,978,047 B2 | 12/2005 | Montgomery | |
| 7,158,689 B2 | 1/2007 | Valleriano et al. | |
| 7,730,036 B2 | 6/2010 | Blose et al. | |
| 2002/0122067 A1* | 9/2002 | Geigel et al. | 345/788 |
| 2004/0218910 A1* | 11/2004 | Chang et al. | 386/98 |
| 2006/0165169 A1* | 7/2006 | Ng et al. | 375/240.12 |
| 2009/0003712 A1* | 1/2009 | Mei et al. | 382/225 |
| 2009/0319472 A1 | 12/2009 | Jain et al. | |
| 2010/0077289 A1 | 3/2010 | Das et al. | |
| 2010/0128919 A1 | 5/2010 | Perronnin et al. | |
| 2011/0040760 A1* | 2/2011 | Fleischman et al. | 707/737 |

FOREIGN PATENT DOCUMENTS

EP    990997    4/2000

OTHER PUBLICATIONS

Kennedy et al, How Flickr Helps Us Make Sense of the World: Context and Content in Community-Contributed Media Collections, Proc. of ACM Multimedia 2007.
Wang et al, Locality-constrained linear coding for image classification, Proc. of IEEE Computer Society Conf. on Computer Vision and Pattern Recognition, 2010.
Torralba et al, Context-based vision system for place and object recognition, Proc. of Inter. Conf. on Computer Vision, 2003.
Marc Davis et al: "From Context to Content: Leveraging Context to Infer Media Metadata" Internet Citation, Oct. 10, 2004 XP002374239, URL: New York, USA.
Platt J C et al: "PhotoTOC: Automatic Clustering for Browsing Personal Photographs", Information, Communications and Signal Processing, 2003 and Fourth PAC IFIC Rim Conference on Multimedia. Proceedings of the 2003 joint Conference of the fourth International Conference on Singapore, Dec. 15-18, 2003. Piscataway, NJ, USA, IEEE, vol. 1,, pp. 6-10, ISBN:987-0/7803-8185-8.

\* cited by examiner

*Primary Examiner* — Hung Dang
*Assistant Examiner* — Sunghyoun Park
(74) *Attorney, Agent, or Firm* — Hogan Lovells US LLP

(57) ABSTRACT

A method for organizing individual collections of images or videos captured for the same event by different cameras into a master collection, wherein each individual collection forms a media stream in chronological order, includes using a processor to provide the following steps: extracting image features for each image or video of the media stream of each individual collection; analyzing the extracted features to align the media streams to form a master stream in chronological order of the event over a common timeline; producing a master collection of images or videos of the event from the master stream by removing redundant images or videos; and storing, displaying or transmitting the master collection.

6 Claims, 10 Drawing Sheets

ALIGNING AND SUMMARIZING DIFFERENT PHOTO STREAMS

CROSS-REFERENCE TO RELATED APPLICATIONS

Reference is made to commonly assigned U.S. patent application Ser. No. 12/942,407 filed Nov. 9, 2010, entitled "Method for Aligning Different Photo Streams" by Jiebo Luo et al. and U.S. patent application Ser. No. 12/942,422 filed Nov. 9, 2010, entitled "Aligning and Annotating Different Photostreams" by Jianchao Yang et al., the disclosures of which are incorporated herein.

FIELD OF THE INVENTION

The present invention generally relates to photo management and sharing, and particularly organizing photo and video streams captured for the same event by different digital cameras.

BACKGROUND OF THE INVENTION

In recent years, the popularity of digital cameras has lead to a flourish of personal digital photos. For example, Kodak Gallery, Flickr and Picasa Web Album host millions of new personal photos uploaded every month. Many of these images were photos taken when people visited various interesting places or attending various interesting events around the world.

With the popularity of digital cameras and online photo sharing, it is common for different people, who may or may not know each other, to attend the same event and take pictures and videos from different spatial or personal perspectives using different cameras.

In addition, people typically on their own take many more photos than needed with digital cameras due to the high storage capacity and low cost of flash memory cards. Therefore, collectively people often end up with multiple photo albums or media streams, each with many photos, for the same event. It is desirable to enable these people to share their pictures and videos in order to enrich memories and facilitate social networking. However, it is cumbersome to manually select and arrange these photos from different digital cameras of which the time settings are often not calibrated.

At the same time, it is non-trivial to perform the same task automatically using a computer algorithm because the digital camera settings of the multiple digital cameras are usually not coordinated. If the clock in every camera is perfectly set and thus in sync with others, it would be easy to align all the photos taken by different digital cameras and manage them accordingly.

A fast-emerging trend in digital photography and community photo sharing is user tagging and geo-tagging. Geo-tagging is the process of adding geographical identification metadata to various media such as websites or images and is a form of geospatial metadata. It can help users find a wide variety of location-specific information. For example, one can find images taken near a given location by entering latitude and longitude coordinates into a geo-tagging enabled image search engine. Geo-tagging-enabled information services can also potentially be used to find location-based news, websites, or other resources. Capture of geo-coordinates or availability of geographically relevant tags with pictures opens up new data mining possibilities for better recognition, classification, and retrieval of images in personal collections and the Web. The published article of Lyndon Kennedy, Mor Naaman, Shane Ahern, Rahul Nair, and Tye Rattenbury, "How Flicks Helps us Make Sense of the World: Context and Content in Community-Contributed Media Collections", Proceedings of ACM Multimedia 2007, discussed how geographic context can be used for better image understanding.

The availability of geo-tagged and user-tagged photos can help establish correspondence between media streams of images and videos captured for the same event by different cameras. For example, if two images from different media streams captured for the same event are tagged with the same location, they are likely to have been taken at the same time. Similarly, if two images from different media streams captured for the same event are tagged with the same image annotation, they are also likely to have been taken at the same time.

U.S. Pat. No. 7,730,036 discloses a method for organizing digital content records and comprising the steps of: receiving a plurality of digital content records, at least some of said digital content records having associated metadata identifying at least a time-date of capture, a location of capture, or a time-date of capture and a location of capture, wherein at least one of the digital content records has associated metadata identifying a time-date of capture, and at least one of the digital content records has associated metadata identifying a location of capture; defining an event at least by identifying a set of event boundaries associated at least with a span of time and a geographic area; identifying digital content records ("event content-records") of the plurality of digital content records to be associated with the event, at least some of the digital content records being identified as event-content records because they meet metadata conditions, wherein the metadata conditions include that the time-date-of-capture metadata and the location-of-capture metadata of the corresponding digital content records identify a time-date-of-capture and a location-of-capture within the span of time and the geographic area, respectively; associating at least some of the event content-records ("associated event-content-records") with the event; storing information identifying the association of the at least some of the event content-records with the event in a computer-accessible memory; and wherein the location-of-capture metadata identifies a network address of a network access point, wherein the geographic area event boundary is defined at least in part by a particular network address, and wherein the metadata conditions include that the network address correspond to the particular network address.

U.S. Pat. No. 6,978,047 describes storing multiple views of the same event for surveillance applications, but in this case, the video cameras are already perfectly synchronized. This system does not provide a way for relating asynchronous captures that occur in less controlled events. U.S. Pat. No. 7,158,689 describes handling asynchronously captured images of an event, but the event type is a special case of a timed event such as a race, and contestants are tracked at various fixed stations. All the above mentioned methods are specific to the applications being described, and provide no framework for handling the generalized problem of managing multiple media streams captured asynchronously at the same event.

U.S. Patent Application Publication 20100077289 describes a method for organizing digital content records, and the method includes the steps of (1) receiving a first set of digital content records captured from a first digital-content capture device, each digital content record in the first set having associated therewith time/date of capture information defining when the associated digital content record was captured, wherein the capture information associated with a particular digital content record from the first set defines that its associated digital content record was captured over a contiguous span of time; (2) receiving a second set of digital content records captured from a second digital-content capture device, each digital content record in the second set having associated therewith time/date of capture information defining when the associated digital content record was captured; and (3) ordering the first set of digital content records and the second set of digital content records along a common capture timeline based at least upon the time/date of capture information, or a derivative thereof, associated with each of the digital content records in the first and second sets, wherein the ordering step causes the particular digital content record and at least one other digital content record to be associated with a same time/date within the span of time in the capture timeline. In addition, their ordering step orders the digital content records along the common timeline also based upon (a) objects identified in, (b) scenery identified in, (c) events associated with, or (d) locations associated with the digital content records.

SUMMARY OF THE INVENTION

In accordance with the present invention, there is a method for organizing individual collections of images or videos captured for the same event by different cameras into a master collection, wherein each individual collection forms a media stream in chronological order, comprising:
  (a) extracting image features for each image or video of the media stream of each individual collection;
  (b) analyzing the extracted features to align the media streams to form a master stream in chronological order of the event over a common timeline;
  (c) producing a master collection of images or videos of the event from the master stream by using a cost function to remove redundant images or videos; and
  (d) storing, displaying or transmitting the master collection.

Features and advantages of the present invention include an efficient way to align two media streams of images or videos captured for the same event, and an effective way to produce a master media collection that maintains the integrity of the event without redundancy in the content of images or videos or to produce an augmented individual collection by using the master collection to augment one of the individual collections.

There are problems solved by the present invention that are not addressed in U.S. Patent Application Publication 20100077289. First, it is unreliable to use directly the time/date of capture information because as mentioned above the absolute meaning of the time/date information may be erroneous. Second, while it is intuitive to order the two sets of digital content records by common objects, scenery, events and locations, none of such information can be reliably derived from images in a reliable manner using current automatic image analysis algorithms. Third, there are cases where the same objects, scenery, events and locations indeed occur at different times. Therefore, the present invention provides an alignment method that resolves the above mentioned problems.

Furthermore, the present invention summarizes the aligned sets of digital content records for browsing because it is desirable to produce a merged set of digital content records that does not contain redundant content. Also the present invention can produce a merged set of digital content records that contain content relevant to the individual need of the owner or viewer of a given set of digital content records.

DETAILED DESCRIPTION OF THE INVENTION

Figure 1:
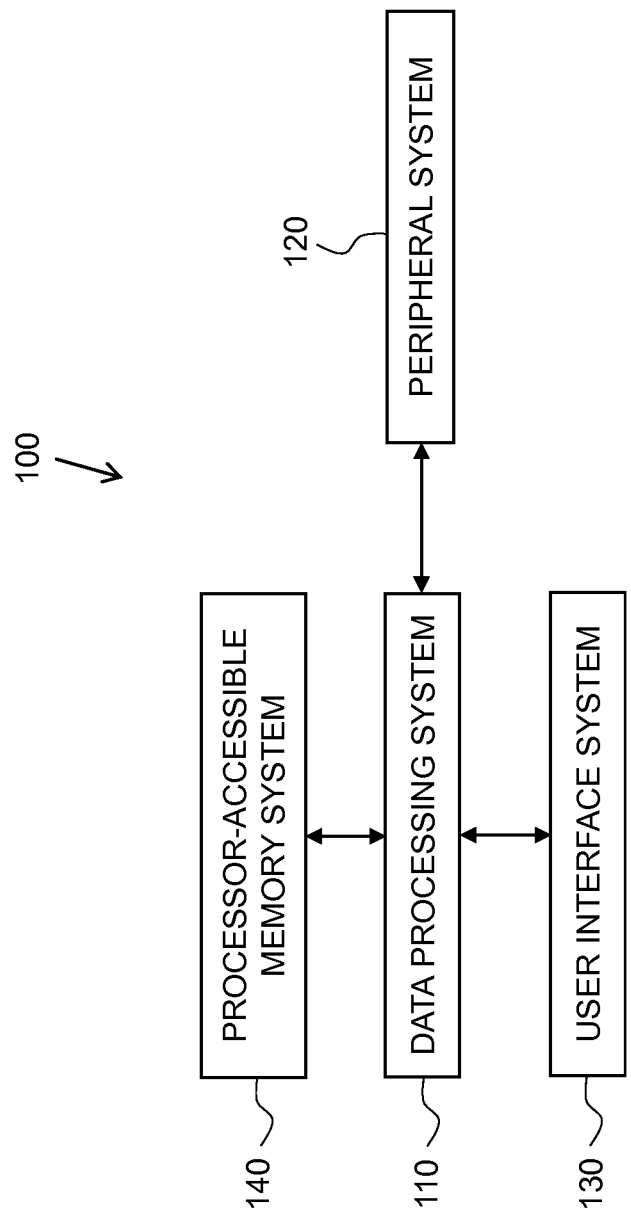
FIG. 1 is a block diagram of a system that will be used to practice an embodiment of the present invention.

FIG. 1 illustrates a system 100 for collaborative photo collection and sharing, according to an embodiment of the present invention. The system 100 includes a data processing system 110, a peripheral system 120, a user interface system 130, and a processor-accessible memory system 140. The processor-accessible memory system 140, the peripheral system 120, and the user interface system 130 are communicatively connected to the data processing system 110.

Figure 2:
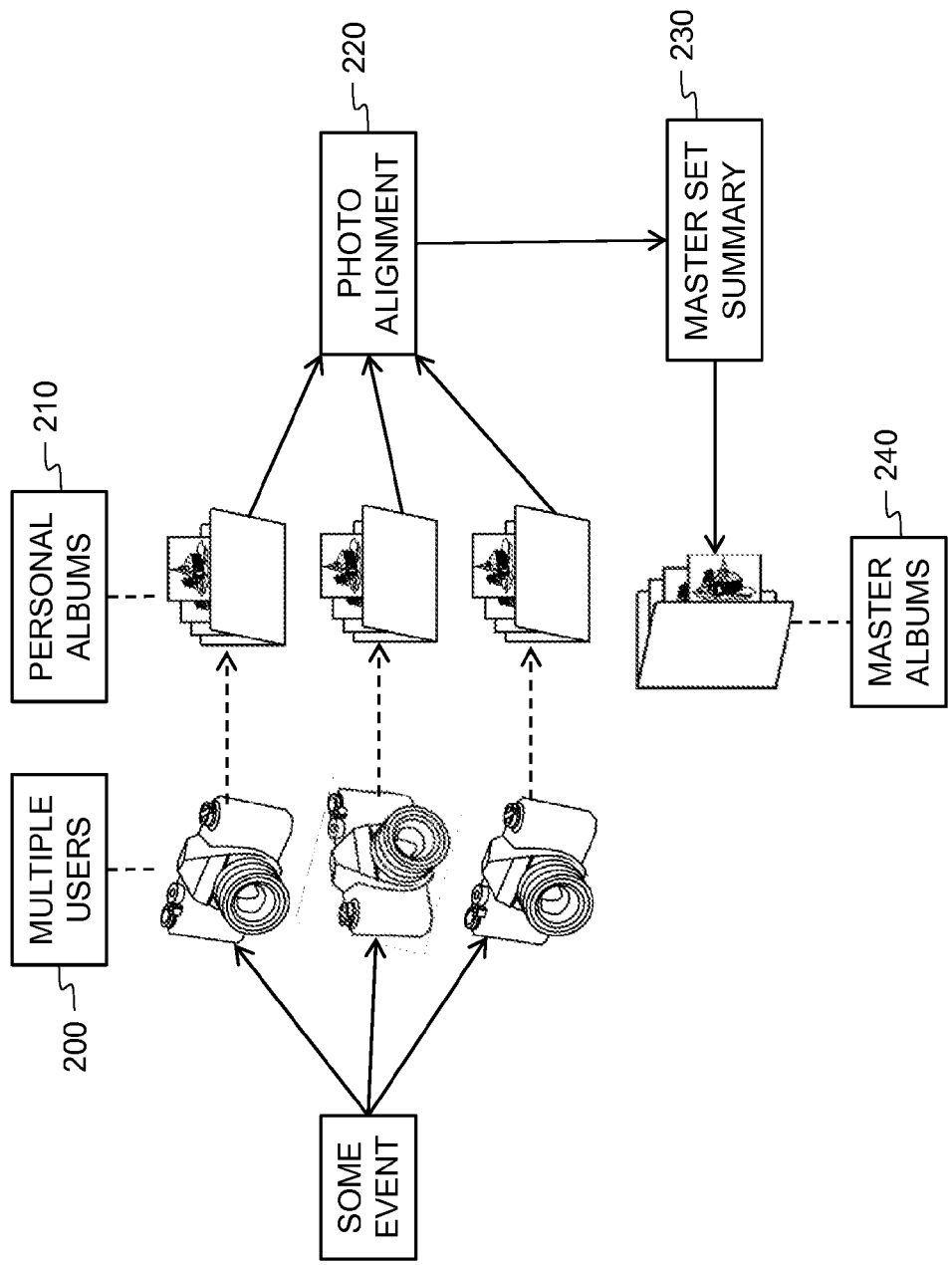
FIG. 2 is a diagram of components of the present invention.

The data processing system 110 includes one or more data processing devices that implement the processes of the various embodiments of the present invention, including the example process of FIG. 2. The phrases "data processing device" or "data processor" are intended to include any data processing device, such as a central processing unit ("CPU"), a desktop computer, a laptop computer, a mainframe computer, a personal digital assistant, a Blackberry™, a digital camera, cellular phone, or any other device or component thereof for processing data, managing data, or handling data, whether implemented with electrical, magnetic, optical, biological components, or otherwise.

The processor-accessible memory system 140 includes one or more processor-accessible memories configured to store information, including the information needed to execute the processes of the various embodiments of the present invention. The processor-accessible memory system 140 can be a distributed processor-accessible memory system including multiple processor-accessible memories communicatively connected to the data processing system 110 via a plurality of computers or devices. On the other hand, the processor-accessible memory system 140 need not be a distributed processor-accessible memory system and, consequently, can include one or more processor-accessible memories located within a single data processor or device.

The phrase "processor-accessible memory" is intended to include any processor-accessible data storage device, whether volatile or nonvolatile, electronic, magnetic, optical, or otherwise, including but not limited to, registers, floppy disks, hard disks, Compact Discs, DVDs, flash memories, ROMs, and RAMS.

The phrase "communicatively connected" is intended to include any type of connection, whether wired or wireless, between devices, data processors, or programs in which data can be communicated. Further, the phrase "communicatively connected" is intended to include a connection between devices or programs within a single data processor, a connection between devices or programs located in different data processors, and a connection between devices not located in data processors at all. In this regard, although the processor-accessible memory system 140 is shown separately from the data processing system 110, one skilled in the art will appreciate that the processor-accessible memory system 140 can be stored completely or partially within the data processing system 110. Further in this regard, although the peripheral system 120 and the user interface system 130 are shown separately from the data processing system 110, one skilled in the art will appreciate that one or both of such systems can be stored completely or partially within the data processing system 110.

The peripheral system 120 can include one or more devices configured to provide digital images to the data processing system 110. For example, the peripheral system 120 can include digital video cameras, cellular phones, regular digital cameras, or other data processors. The data processing system 110, upon receipt of digital content records from a device in the peripheral system 120, can store such digital content records in the processor-accessible memory system 140.

The user interface system 130 can include a mouse, a keyboard, another computer, or any device or combination of devices from which data is input to the data processing system 110. In this regard, although the peripheral system 120 is shown separately from the user interface system 130, the peripheral system 120 can be included as part of the user interface system 130.

The user interface system 130 also can include a display device, a processor-accessible memory, or any device or combination of devices to which data is output by the data processing system 110. In this regard, if the user interface system 130 includes a processor-accessible memory, such memory can be part of the processor-accessible memory system 140 even though the user interface system 130 and the processor-accessible memory system 140 are shown separately in FIG. 1.

The present invention aims to build an automatic system using the above mentioned processor to address the photo sharing problem mentioned in the background section, i.e., organizing individual collections of images or videos captured for the same event by different cameras into a master collection.

The phrase, "digital content record", as used herein, refers to any digital content record, such as a digital still image, a digital audio file, or a digital video file, or a frame of a digital video. The phrase, "media stream", as used herein, refers to any sequence of a plurality of digital content records, such as digital still images, digital audio files or digital video files.

Referring to FIG. 2, there is shown a diagram of the present invention. Multiple cameras 200 are used to make digital content records such as images or videos for the same event, where the camera time settings are typically not calibrated. The result is in multiple media collections or media streams 210. Media stream alignment 220 is first performed to align the different media collections or media streams 210 with respect to a common time line in chronological order. The aligned media collections or media streams 210 are then merged to form a master stream 230, which is further processed to produce a master collection 240 that maintains the integrity of the event without redundant images or videos.

In algorithmic steps, the operations of the present invention are implemented in the following steps by the data processing system 110 in FIG. 1. Referring now to the flow cart of FIG. 3 (and FIG. 2 when applicable), the present invention first involves a step 310 to assemble individual media collections or media streams 210 of images or videos captured for the same event by different cameras 200 into individual media streams 210. Next, a step 320 is performed to extract image features for each image or video of the media stream 210 of each individual collection. It is possible to extract and include other non-image features such as geo-locations (e.g., geo-tags) or other textual tags (e.g., user annotations) associated with the images or videos. Furthermore, another step is performed 330 to analyze the extracted features to align the media streams 210 to form the master stream 230 in chronological order of the event. Another step 340 is performed to produce the master collection 240 of images or videos of the event from the master stream 230 by removing redundant images or videos. Optionally, a further step 350 includes using the master collection 240 to augment one of the individual collections to produce an augmented individual collection.

Any of the master stream 230, the master collection 240, and the augmented individual collection can be stored in the processor-accessible memory system 140 of the data processing system 110 in FIG. 1. Furthermore, any of them can be displayed on a display device or transmitted over communication networks.

Figure 3:
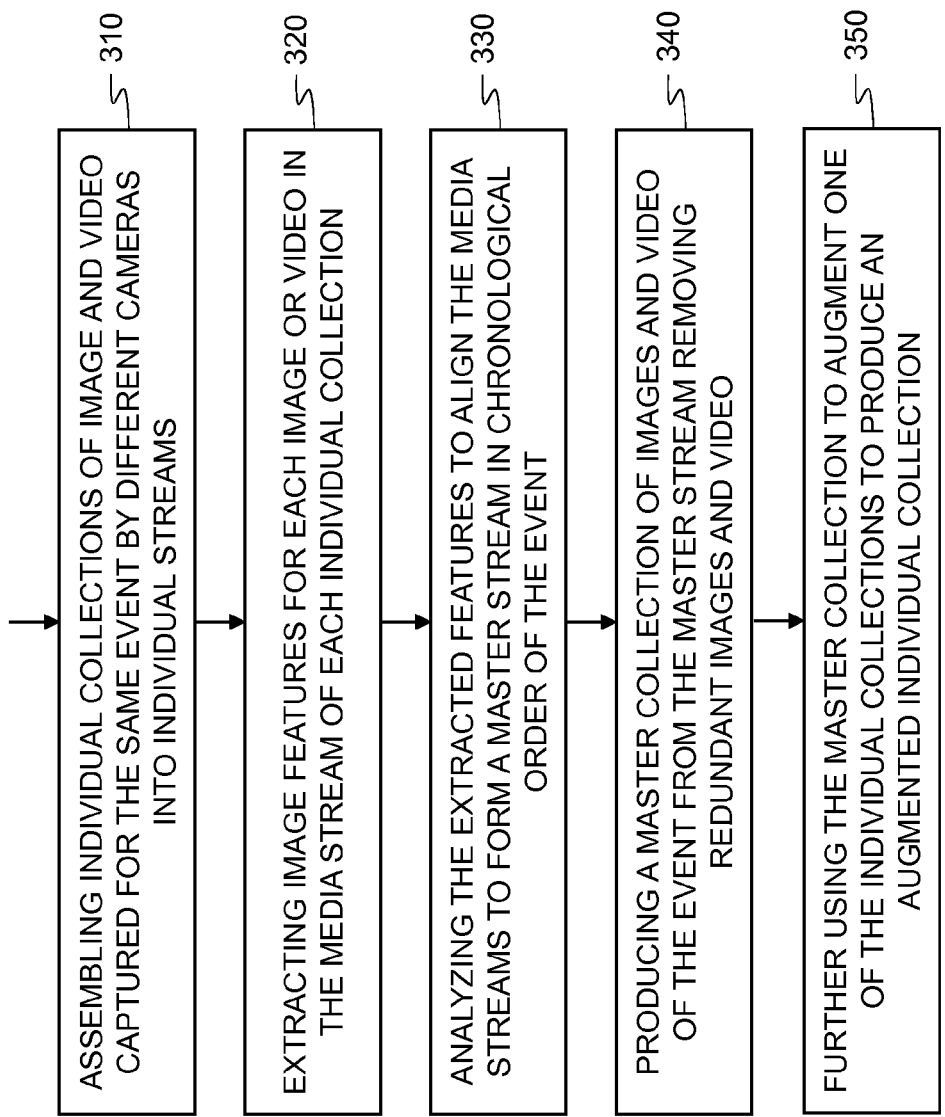
FIG. 3 is a flow chart of the operations performed by the data processing system 110 in FIG. 1.
Figure 4:
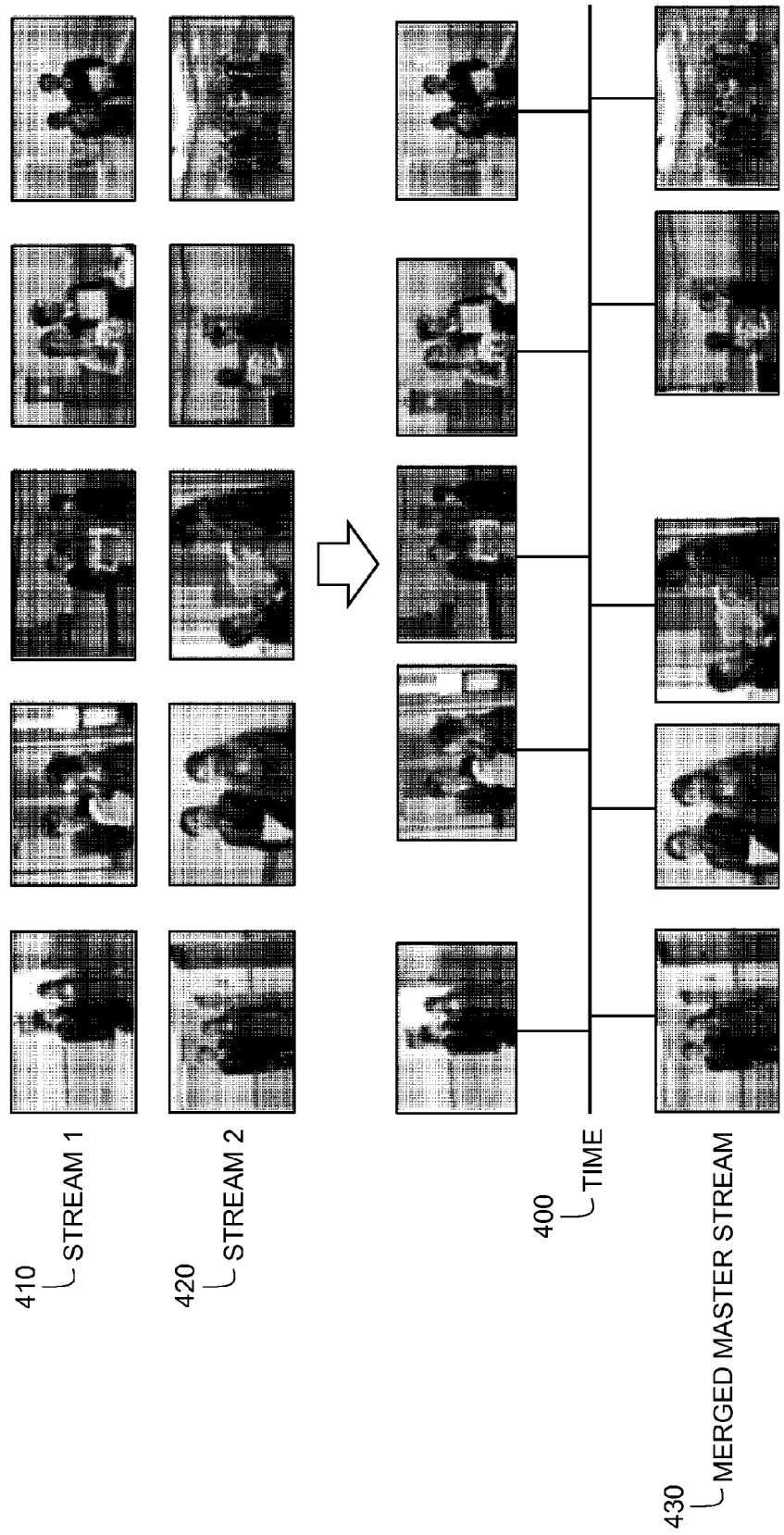
FIG. 4 is a pictorial illustration of two individual media streams that are aligned to form a merged media stream by the present invention.

The operations described in FIG. 3 are pictorially illustrated using examples in FIG. 4, where a first media stream 410 and a second media stream 420 are aligned with respect to a common time line 400 to form a merged media stream 430, according to an embodiment of the present invention.

The details about the steps of the present invention are described in the following. Note that for simplicity, the following descriptions are presented with respect to photos, although anyone who is skilled in the part can substitute videos for images in part or entirety without departing from the characteristics of the present invention as a video can be represented by one or more of its frames.

The basic assumption is that different media streams or photo sequences have some degree of temporal-visual correlation. In other words, the appearance of the same object, scene and event, are expected at least once between the different media streams. Such co-appearance is an indication, though not necessarily absolute trustworthy, of a possible temporal alignment between images in different photo sequences. Although it is conceivable that one who is skilled in the art can detect the same object, scene and event in order to align images from different photo streams, as taught in U.S. Patent Application Publication 20100077289, such detection is bypassed in a preferred embodiment of the present invention. Instead, image matching of correlated content is performed directly through visual similarity matching between images from different photo streams.

Figure 6:
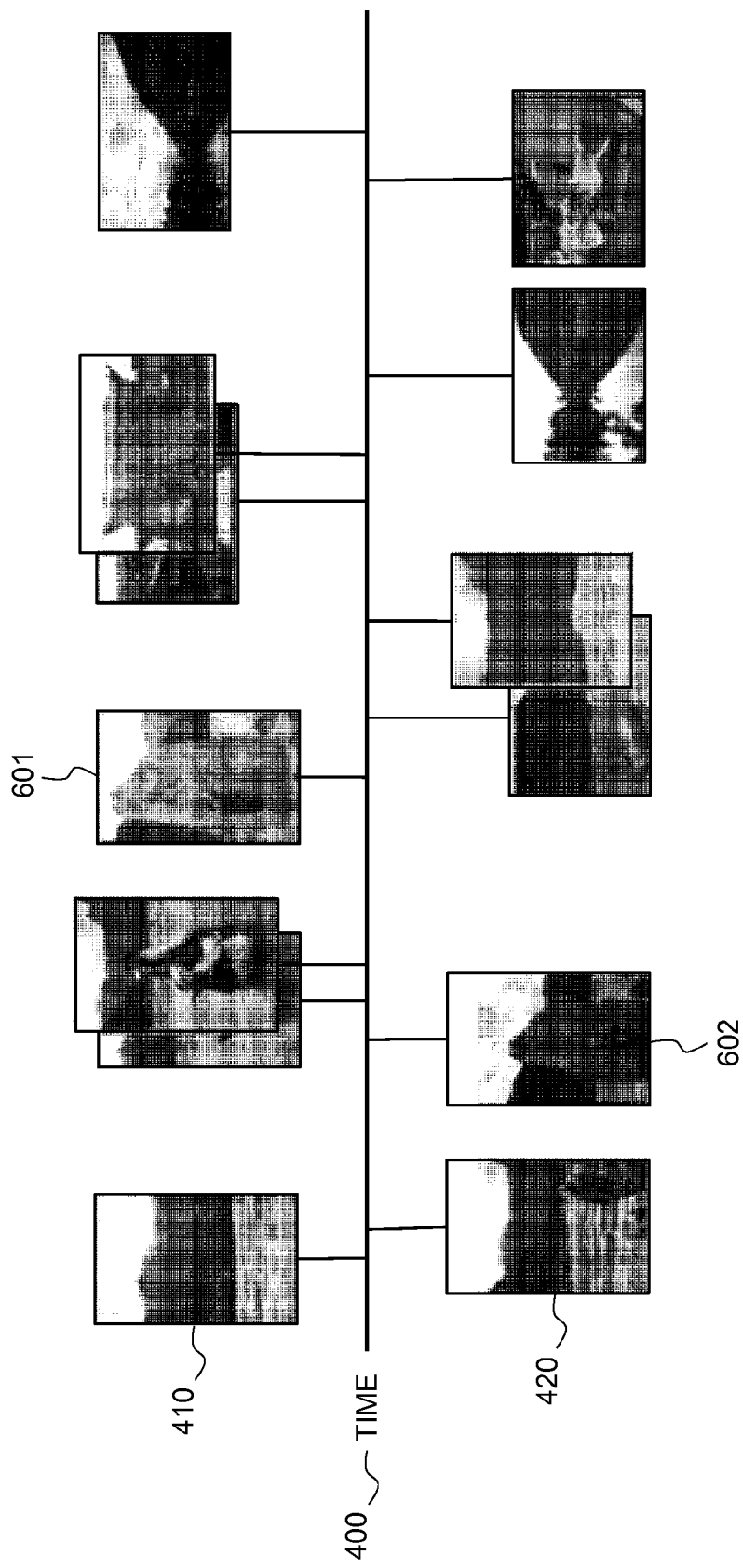
FIG. 6 is a pictorial illustration of two media streams in which the same object appear at different times in different media stream.

There are several advantages due to this choice in the preferred embodiment of the present invention. First, determination of the temporal alignment between different photo streams is not affected by any error in the detection of the same object, scene and event. Second, there are cases where the same matching objects, scenery, events and locations indeed occur at different times. An example of this case is illustrated in FIG. 6, where the same monument was pictured by different users at different points along the common time line 400 (the 4th image 601 in the first photo stream 410 was taken later than the 2nd image 602 in the second photo stream 420 because the two users do not always lock steps with each other.

The following image or visual features are used (equally weighted) in a preferred embodiment of the present invention due to their simplicity and effectiveness:

Square root normalized color histogram. This feature is an evidently important cue for consumer photos because it captures the global distribution of colors in an image. This feature is fast and also fits a linear kernel well.

LLC. Locality-constrained linear coding is one of the state-of-the-art appearance features for image classification. Details can be found in J. Wang, J. Yang, K. Yu, F. Lv, T. Huang, and Y. Gong, Locality-constrained linear coding for image classification, in the Proceedings of IEEE Computer Society Conference on Computer Vision and Pattern Recognition, 2010. This feature is fast and also fits a linear kernel well.

Gist. This feature is simple and captures the global shape characteristics of an image. Details can be found in A. Torralba, K. P. Murphy, W. T. Freeman, and M. A. Rubin. Context-based vision system for place and object recognition, in the Proceedings of International Conference on Computer Vision, 2003.

Figure 7:
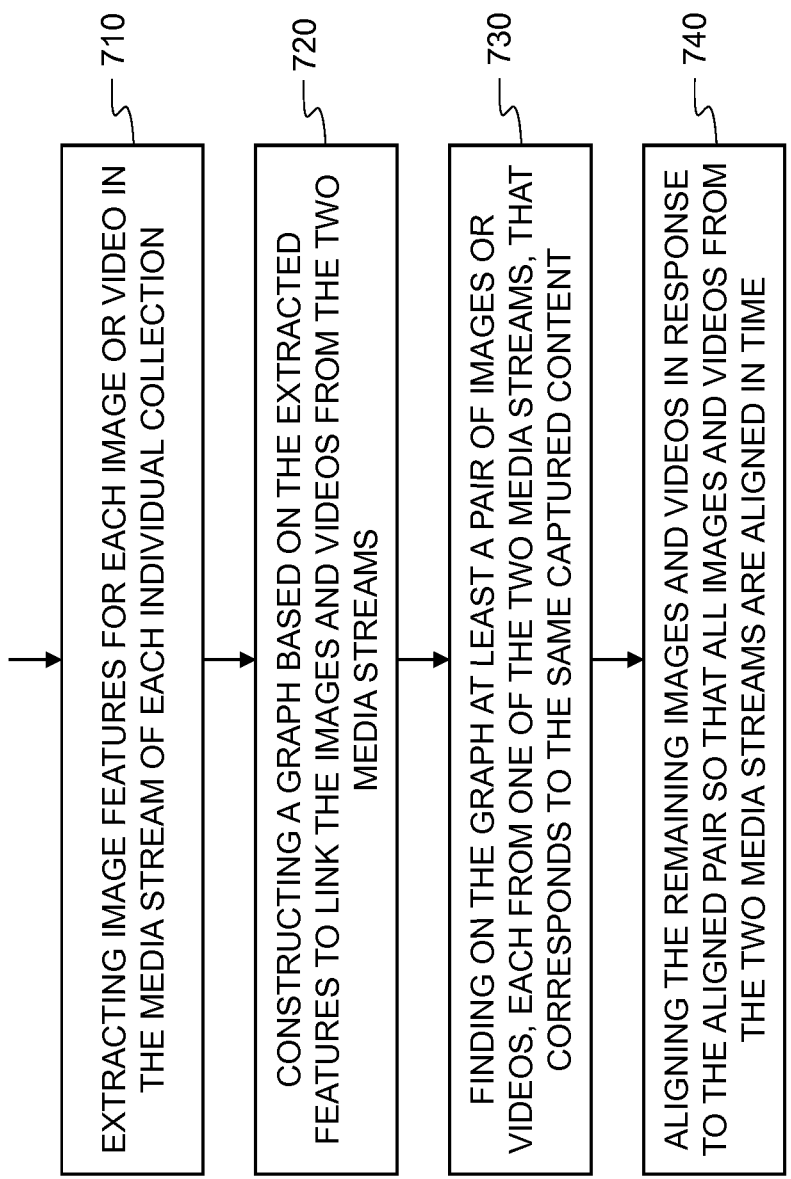
FIG. 7 is block diagram showing a detailed view of the alignment step 330 in FIG. 3.

FIG. 7 is block diagram showing a detailed view of the alignment step 330 in FIG. 3. In a preferred embodiment, a first step 710 is performed to extract image features from pixel data of each image or video of the media stream of each collection. The next step 720 constructs a graph based on the extracted features to link the images or videos from the two media streams. A subsequent step 730 is performed to find on the graph at least a pair of images or videos (each from one of the two media streams) that correspond to correlated captured content. The final step 740 aligns the remaining images or videos in response to the aligned pair so that the all images or videos from the two media streams are aligned in time by respecting the time constraints within each stream.

The alignment of two correlated photo streams is formulated as follows. Each photo is represented as a triplet $\{x; t; g\}$, where x denotes the image itself, t denotes its time stamp, and g denotes the geo-location if it is available (otherwise not used). To keep the notation uncluttered, we simply use x instead of the triplet in the following presentation.

$$S(xi; xj) = Sv(xi; xj) \cent St(xi; xj) \cent Sg(xi; xj); \quad (1)$$

where Sv(xi; xj) is the visual similarity, St(xi; xj) is the time similarity, and Sg(xi; xj) is the GPS similarity between photos xi and xj, respectively. Other information, e.g., photo tags for online albums, can also be incorporated if available.

For two photo sequences S1 and S2, they can be represented by $$S_1 = \begin{bmatrix} x_1^1 & x_2^1 & \ldots & x_m^1 \\ t_1^1 & t_2^1 & \ldots & t_m^1 \end{bmatrix} \quad (2)$$

$$S_2 = \begin{bmatrix} x_1^2 & x_2^2 & \ldots & x_n^2 \\ t_1^2 & t_2^2 & \ldots & t_n^2 \end{bmatrix}$$

A similarity measure (can generalize to include go-location and user photo tags) is needed for a pair of photos xi and xj, $$s_{ij} = s(x_i^1, x_j^2) = \Phi(x_i^1)^T \Phi(x_j^2) \quad (3)$$

where $\Phi(\cdot)$ is the implicit feature mapping function for the kernel space.

It is assumed that the relative time inside both S1 and S2 is correct, but the relative time shift $\Delta T$ between S1 and S2 is unknown. The present invention finds the time shift $\Delta T$ between S1 and S2 such that there are appropriate matches between the corresponding images in the two photo streams in terms of visual features.

Figure 5:
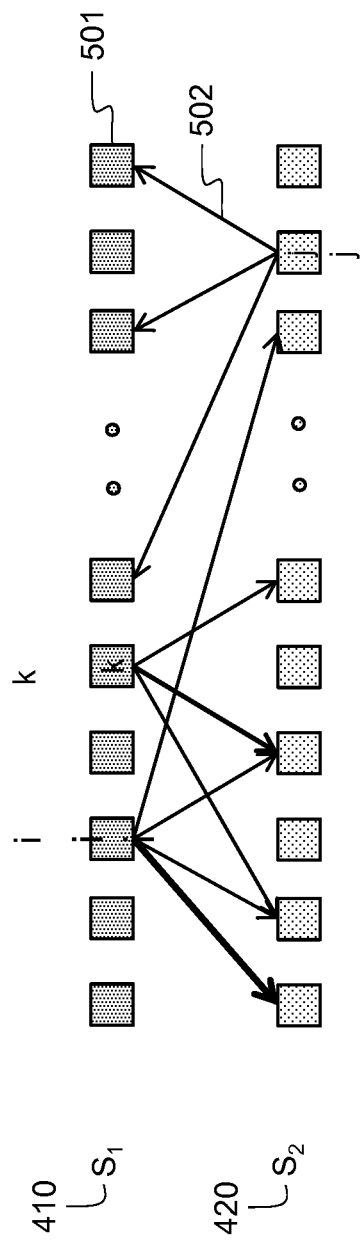
FIG. 5 is a pictorial illustration of a graph used by the present invention.

In a preferred embodiment, a sparse bipartite graph G as shown in FIG. 5 is used to enable the steps described in FIG. 7. A node 501 represents a photo in a photo stream, for example, node i and node k represent two photos in the first stream, and node j represents a photo in the second stream. Each photo i in the first photo stream is initially linked to all the photos in the second photo stream by an edge 502. Conversely, each photo j in the second stream is also initially linked to all the photos in the first stream. The strength of each edge is subject to change later.

Since people tend to have certain common photo taking interests and camera viewpoints, different photo sequences for the same event usually share similar visual contents. If correspondences of such visual contents can be found using the bipartite graph G, the correct time shift $\Delta T$ can be determined to align the entire two photo streams. However, consumer photos are not continuously captured over time, and different photo takers do have different interests, view points, and timing, it is only reasonable to expect that strongly informative photo links between two photo sequences about the same event should be sparse. For alignment of correlated photo streams, it is adequate to find such sparse yet informative links between two streams as other photos in each photo stream would fall into places once at least one strongly informative photo link is determined to provide the time shift. In the case of multiple but perhaps somewhat conflicting informative links, a compromised time shift can be determined. More details on this will be provided later.

In the following, the process of using the bi-partite graph to find time shift $\Delta T$ is described using visual feature similarity, although people who are skilled in the art can incorporate geo-location features and user-tag features in measuring image similarities to determine the correspondences.

Again referring to FIG. 5, given candidate matches on the sparse bi-partite graph, first for each node in X1, it is linked to the nodes in sequence X2 by formulating the problem as a sparse representation problem in the implicit kernel space.

$$\alpha_i^1 = \underset{\alpha}{\operatorname{argmin}} \|\Phi(x_i^1) - \Phi(X_2)\alpha\|_2^2 + \lambda\|\alpha\|_1 + \beta\|\alpha\|_2^2, \quad (4)$$

$$\Phi(X_2) = [\Phi(x_1^2), \Phi(x_2^2), \ldots, \Phi(x_n^2)]$$

Where serves as the dictionary for representation, $\alpha$ is the vector that contains all the weights on the edges of the graph, $\lambda$ and $\beta$ are small regularization factors to stabilize the sparse solution.

The sparse vector $\{\alpha_i^1\}$ encodes the directed edge information of the bipartite graph from X1 to X2. The edge weights are determined based on the sparse solution that can be found in many existing sparse coding packages:

$$E_{ij}^{12} = |\alpha_i^1(j)|, \text{ where } x_i \in X_1, x_j \in X_2. \quad (5)$$

Similarly, each node in X2 can be linked to sequence X1, and obtain another set of directed edge weights. The final undirected bipartite graph weights are determined by $$E_{ij} = \frac{1}{2}(E_{ij}^{12} + E_{ji}^{21}). \tag{6}$$

Note that using the average of the two directed edge weights makes the bipartite graph linkage more informative. If both terms on the right side of Eq. (6) are significantly nonzero, meaning that both images choose the other one as one of its significantly linked neighbors among many others, these two images are strongly connected and therefore are more likely to be an informative pair useful for the alignment.

The above sparse bipartite graph construction is based on geo-location constrained visual information, without respecting the chronological time stamps within each camera sequence. These sparse linkages provide the candidate matches (linked pairs), from which the correct time shift will be inferred. However, due to the semantic gap of visual features, these candidate matches are too noisy for precise alignment. In a preferred embodiment of the present invention, max linkage selection is used to perform candidate match pruning: if a node has multiple links with other nodes, an edge with max weight is retained or removed otherwise. In this way, the retained match pairs are more informative for the alignment task.

Denote the set of pruned matched (linked) node pairs as $\mathcal{M} = \{(x_i^1, t_i^1; x_j^2, t_j^2) | E_{ij} \neq 0\}$, where $t_i^1$ and $t_j^2$ are the camera time stamps for $x_i^1$ and $x_j^2$, respectively. The correct time shift $\Delta T$ is found by searching the maximum volume match:

$$\Delta T = \underset{\Delta t}{\operatorname{argmax}} \sum_{(i,j) \in \mathcal{M}} E_{ij} \delta(|t_i^1 - t_j^2 - \Delta t| \leq \tau), \tag{7}$$

where $\delta$ is the indicator function, and $\tau$ is a small time displacement tolerance. Eq. 10 finds the time shift that has maximum weighted matches. $\tau$ is used because exact match in time is not realistic.

Figure 8B:
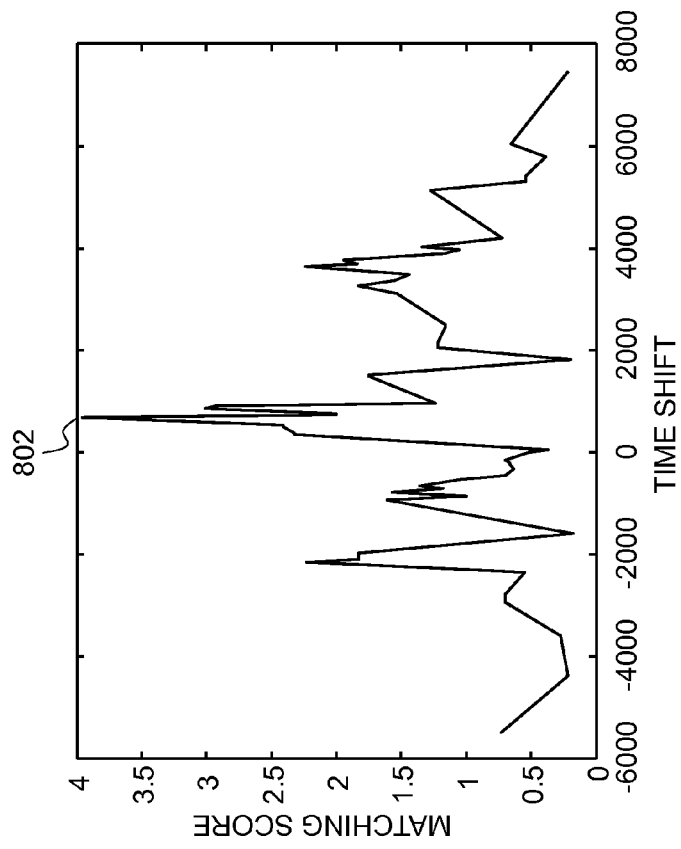
FIGS. 8a and 8b are a pictorial illustration of locating the time shift between two individual media streams.
Figure 8A:
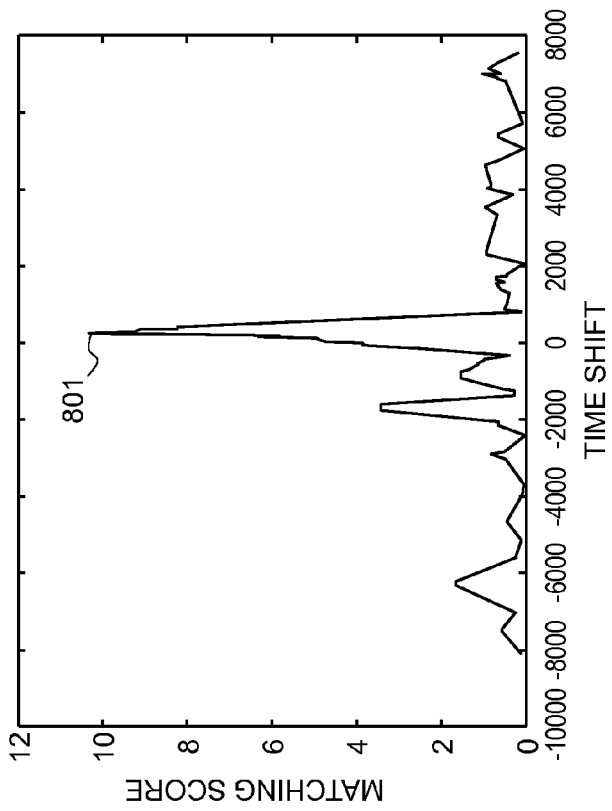

FIGS. 8a and 8b show two examples illustrating how the time shift $\Delta T$ is determined. A range of possible time shift is examined according to Eq. (7) to produce a plot of volume matching scores again the range of possible time shift. In FIG. 8a, it is clear that the correct time shift is around 200 seconds, as indicated by the prominent peak 801 in the plot. However, the case in FIG. 8b is ambiguous because none of the peaks (e.g. 802) is prominent. The latter case is usually caused by photo streams that do not contain informative visual contents.

In practice, there can be more than two photo sequences for the same event. Pair-wise sequence matching can be performed to align pairs of photo streams, preferably with respect to the stream with most number of photos or covering the longest duration.

Once the time shift is determined using the steps of FIG. 7, the two individual photo streams can be merged into one master stream with respect to the common time line in chronological order, as illustrated in FIG. 4 and FIG. 6. In general, there are two sources of redundancy with the master stream:

Intra-camera redundancy: people take more photos with the same digital camera
Inter-camera redundancy: people take pictures of similar interests and viewpoints with different cameras Therefore, there is a need to further process the merged master stream to produce a consolidated mater collection 240 that maintains the integrity of the event without redundant images or videos. Note that this process is referred to as master stream summarization, which is performed on the same type of sparse graph used for in the alignment process.

The purpose of a sparse representation graph is to build the links of one node with all the others by examining the sparse representation vector of this node using all the others as the dictionary. Algorithm 1 shows the process of constructing the sparse representation graph and outputs an augmented similarity graph W.

---

Algorithm 1 Sparse Representation Graph Construction

1: Input: a similarity matrix $W^\Phi$ for X, with $W_{ij}^\Phi = S(x_i, x_j)$ as defined in Eq. 1, and a regularization parameter $\lambda = 0.5$.
2: Initialize: $W = I \in \mathbb{R}^{|X| \times |X|}$.
3: for k = 1 to |X| do
4:   Solve the following optimization in the kernel space based on the give similarity matrix $W^\Phi$ $$\alpha^* = \underset{\alpha}{\arg\min} \ \|\Phi(x_k) - \Phi(D_k)\alpha\| + \lambda \|\alpha\|_1, \tag{17}$$

where
$$\Phi(D_k) = [\Phi(x_1), \ldots, \Phi(x_{k-1}), 0, \Phi(x_{k+1}), \ldots, \Phi(x_{|X|})]. \tag{18}$$

5:   Assign $W_{kt} = [\alpha^*[t]]$, for $t \neq k$.
6: end for
7: Output: the augmented similarity matrix W.

---

Since the sparse graph constructed in Algorithm 1 is directed, the augmented similarity matrix W is asymmetric. Therefore, the final augmented similarity graph is defined as the average of the two directed edge weights to emphasize the strongly connected node pairs. The intuition behind the augmented sparse representation graph is straightforward. If a photo is a redundant one, it has only a few similar photos in the master photo stream, i.e., this photo would only have a sparse representation with respect to the rest of the stream. Therefore, the large weights in the similarity graph correspond to similar and thus redundant photo pairs.

Given a set of photos $X = \{x_1, x_2, \ldots x_{|X|}\}$, a further process of the presentation invention finds a compact subset $C \subset X$, which summarizes the master stream (aligned and combined from individual photo streams) without redundancy. In particular, two requirements are imposed on the master collection C:

Compactness: the master collection should be as small as possible, i.e. the master collection should contain as few redundant photos as possible.
Coverage: to maintain the integrity of the content information contained in the master stream, the master collection should cover or represent the master stream well in the feature space.

Based on these two criteria, the following cost function is formulated to find the desired master collection C:

$$C^* = \underset{C \in X}{\operatorname{argmin}} \ L_s(C, X) + \gamma L_r(C), \tag{8}$$

where $L_s(C; X)$ denotes the information loss incurred by representing X with the summarization set C, $L_r(C)$ denotes the information redundancy contained in C, and $\gamma$ balances the two terms.

In a feature space with kernel mapping function φ(•), an augmented feature space of Φ(•), based on the sparse representation graph W described in Algorithm 1, the information loss term is then defined as the representation error for X using C in this augmented feature space:

$$L_s(C, X) = \sum_{i=1}^{|X|} L_s(C, x_i), \quad (9)$$

where $$L_s(C, x_i) = \min_{\|z\|_0 \leq k} \|\varphi(x_i) - \varphi(C)z\|_2^2. \quad (10)$$

Simply setting k=1, the information redundancy of C is defined as its divergence from orthogonality $L_r$ $$L_r(C) = \|\phi(C)^T\phi(C) - I\|_F, \quad (11)$$

where I is the identity matrix, meaning that C should be as orthogonal as possible. Note that the Frobenius norm here also favors a smaller master collection C.

With the augmented similarity measure defined by the above sparse representation graph, the master collection C can be found according to Eq. (8). However, the optimization for C is nontrivial. Finding C requires selecting the smallest model that can well represent the original dataset X In a preferred embodiment of the present invention, a greedy backward selection algorithm is used to find the approximate solution. The purpose is to greedily prune the samples in X until an effective objective function value is achieved. Algorithm 2 describes the procedure of finding the master collection C.

---

Algorithm 2 Greedy backward selection.

Input: Augmented similarity matrix W for X, parameter
γ = 1e − 3.
Initialize: C = X, and f = inf.
loop
    for i = 1 to |C| do
        Find v(i) = $L_s(C_c,X) + \gamma L_r(C_c)$, where $C_c$ =
        C\{i}.
    end for
    Assign $f_o$ = f.
    [f,k] = min(v), with k being the index for the minimum.
    if f > $f_o$ then
        Return C.
    end if
    Update C = C\C(k).
end loop

---

Figure 10:
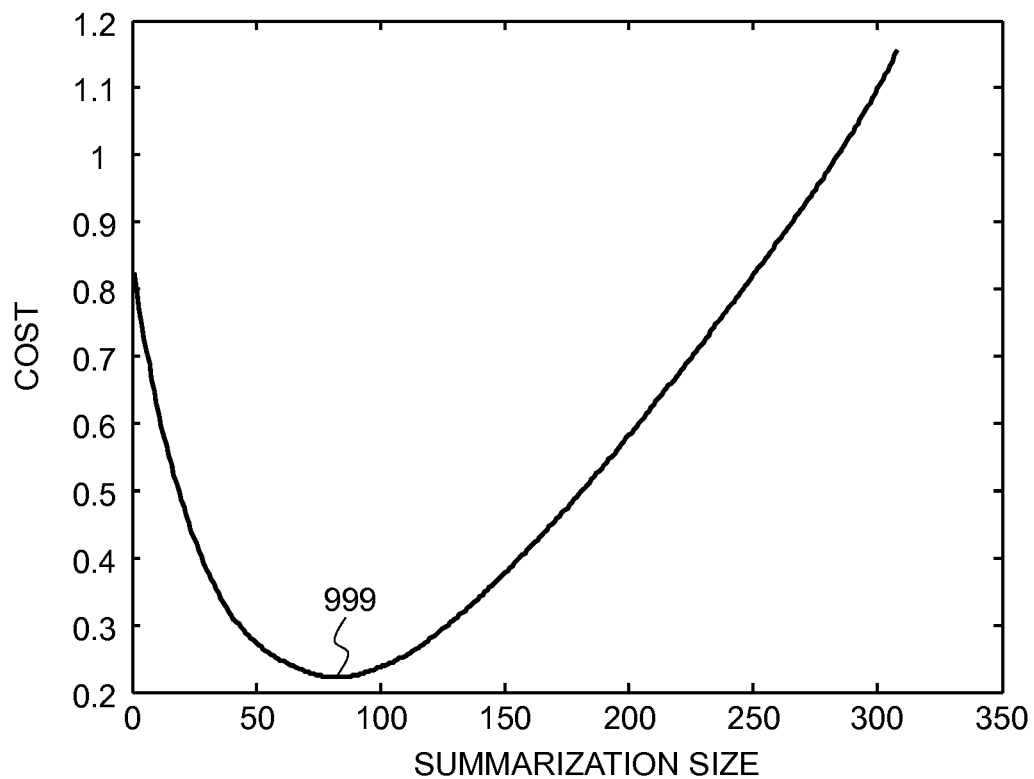
FIG. 10 is a pictorial illustration of automatically determining the size of master media stream by the present invention.

Referring now to FIG. 10, an example plot of the summarization cost against the summarization size, i.e., the size of the master collection is shown. A summarization size corresponding to the lowest cost is indicated by the lowest point 999 on the plot. This summarization size represents a particular selection of images for the master collection.

Figure 9:
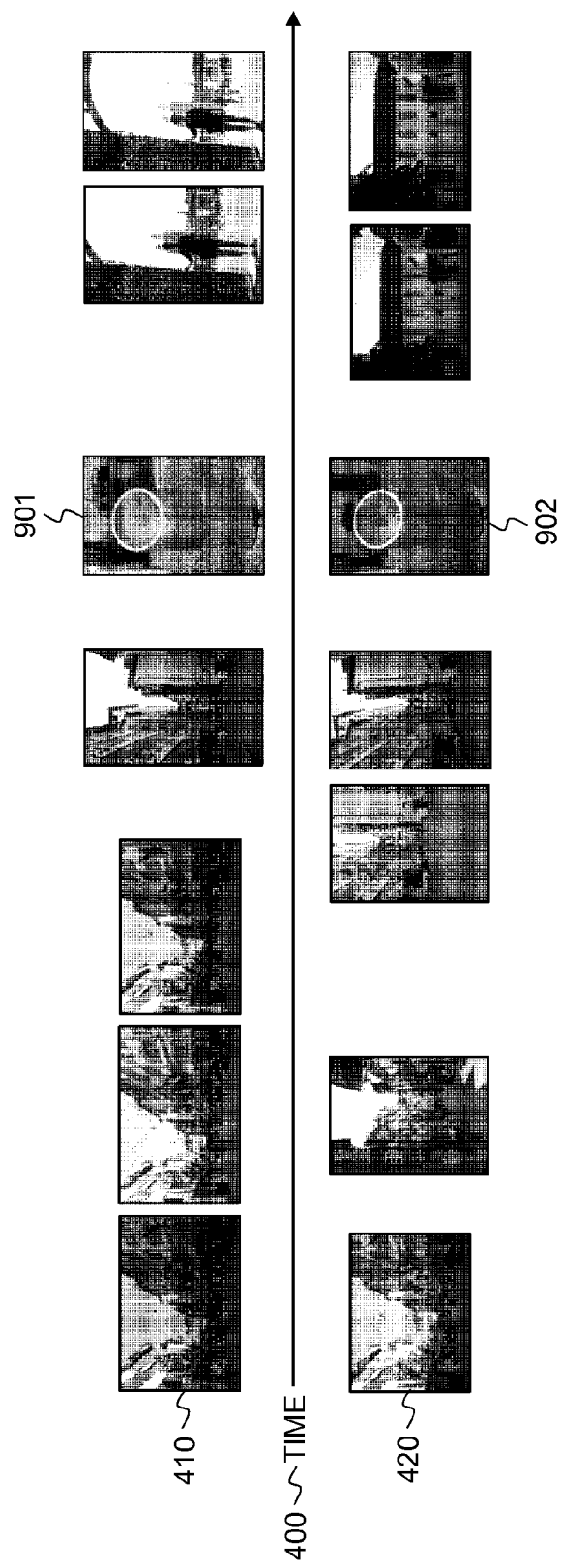
FIG. 9 is an example of image selection in the master media collection from two individual media streams.

As illustrated in FIG. 9, following the common time line 400, a plurality of photos from the first individual stream 410 and a plurality of photos from the second individual stream 420 are selected to form the master collection, while other images are discarded. In particular, a photo 901 from the first stream 410 is selected and retained in the master collection while its counterpart 902 of similar visual content in the second stream 420 is unselected and discarded.

The various embodiments described above are provided by way of illustration only and should not be construed to limit the invention. Those skilled in the art will readily recognize various modifications and changes that can be made to the present invention without following the example embodiments and applications illustrated and described herein, and without departing from the true spirit and scope of the present invention, which is set forth in the following claims.

PARTS LIST 100 system
110 Data processing system
120 Peripheral system
130 User interface system
140 Processor-accessible memory system
200 Multiple cameras
210 media collections or media streams
220 Stream alignment process
230 Master stream
240 Master collection
310 Step of assembling individual media collections of images or video captured for the same event by different cameras into individual media streams.
320 Step of extracting image features for each image or video of the media stream of each individual collection
330 Step of analyzing the extracted features to align the media streams to form a master stream in chronological order of the event
340 Step of producing a master collection of images or videos of the event from the master stream by removing redundant images or videos
350 Step of using the master collection to augment one of the individual collections to produce an augmented individual collection
400 Time line
410 A first media stream
420 A second media stream
430 Merged master stream
501 A node in a graph
502 An edge in a graph
601 A first photo in a first media stream
602 A second photo in a second media stream that contains correlated captured content with the first photo but captured at a different time
710 Step of extracting image features for each image or video of the media stream of each collection
720 Step of constructing a graph based on the extracted features to link the images or videos from the two media streams
730 Step of finding on the graph at least a pair of images or videos, each from one of the two media streams, that corresponds to the same captured content
740 Step of aligning the remaining images or videos in response to the aligned pair so that the all images or videos from the two media streams are aligned over a common time line
801 A prominent peak
802 An ambiguous peak
901 A photo selected for the master collection
902 A photo unselected for the master collection
999 A lowest cost point

The invention claimed is:
1. A method for organizing a plurality of individual media collections containing digital content records into a master collection, comprising:
(a) assembling digital content records from two or more of the plurality of individual media collections, wherein the digital content records are captured for the same event by different persons at different locations at different times;

(b) extracting features from each digital content record in the two or more individual media collections;

(c) analyzing the extracted features to align the digital content records into a chronological master stream of the same event over a common timeline;

(d) compacting the master stream into a master collection by using a cost function to automatically remove redundant digital content records; and (e) storing, displaying or transmitting the master collection.

2. The method of claim 1, further including using the master collection to augment one of the individual media collections to produce an augmented individual media collection, and storing, displaying or transmitting the augmented individual media collection.

3. The method of claim 2, further including analyzing the individual media collections and the master collection to determine which digital content records from the master collection are relevant to the individual media collections, and augmenting the individual media collections with the relevant digital content records.

4. The method of claim 1, wherein step (b) further includes extracting geo-location tags or other textual tags associated to each digital content record as additional features.

5. The method of claim 1, wherein step includes:
(i) constructing a graph based on the extracted features to link the digital content records from the two or more individual media collections;
(ii) finding on the graph at least one aligned pair of digital content records that corresponds to correlated captured content, wherein the aligned pair consists of one digital content record from a first individual media collection and a second digital content record from a second individual media collection; and
(iii) aligning the remaining digital content records from the two or more individual media collections in response to the aligned pair so that the all digital content records from the two or more individual media collections are aligned over a common timeline.

6. The method of claim 1, wherein the cost function is based on at least the following two criteria:
that the master collection should contain as few redundant photos as possible, and
that the master collection should maintain integrity of the content contained in the master stream.

* * * * *